No. 806,117. PATENTED DEC. 5, 1905.
J. H. DICKINSON.
HOISTING AND CONVEYING DEVICE.
APPLICATION FILED JAN. 24, 1902.
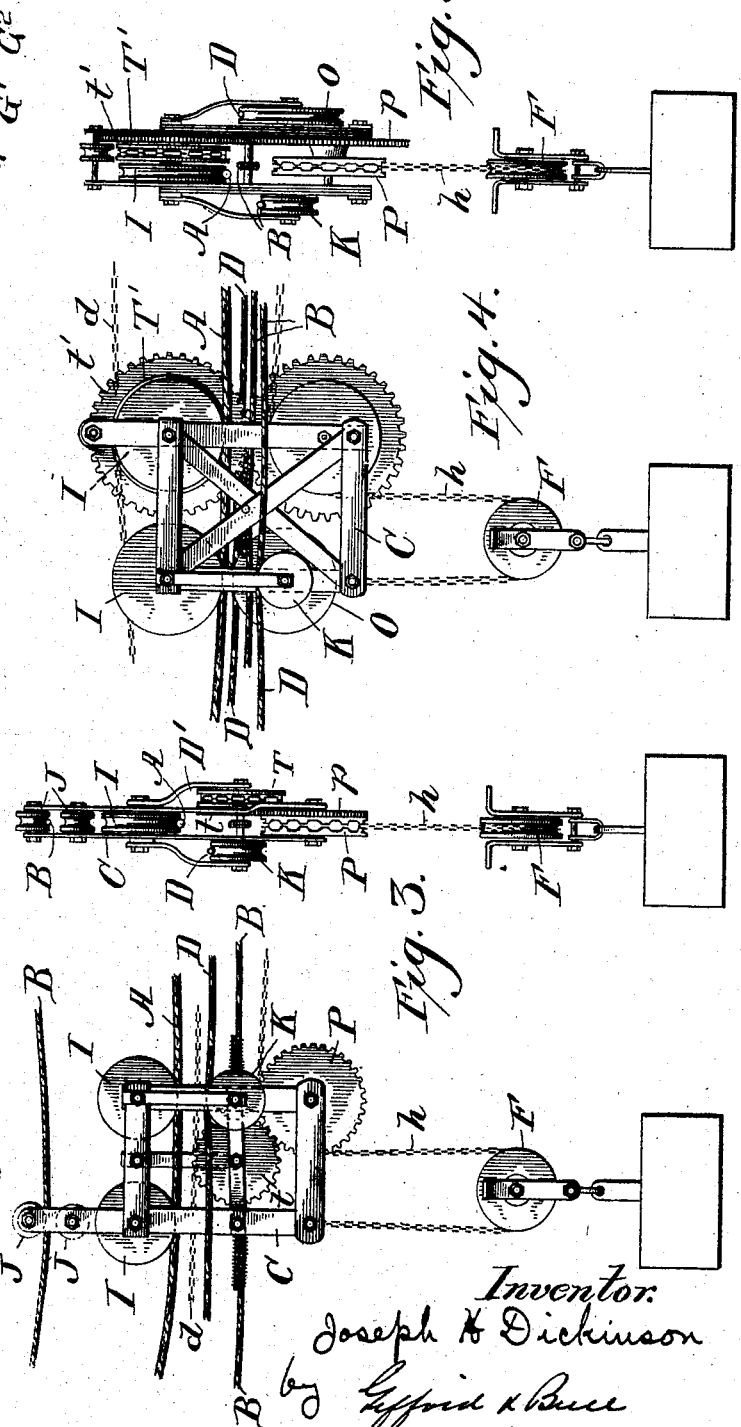
Witnesses:
J. B. McGirr.
Walter A. Pauling.
Inventor:
Joseph H. Dickinson
by Giffard & Bull
attorneys

UNITED STATES PATENT OFFICE.

JOSEPH H. DICKINSON, OF ATLANTA, GEORGIA, ASSIGNOR TO THE LIDGERWOOD MANUFACTURING COMPANY, A CORPORATION OF NEW YORK.

HOISTING AND CONVEYING DEVICE.

No. 806,117.  Specification of Letters Patent.  Patented Dec. 5, 1905.

Application filed January 24, 1902. Serial No. 91,131.

*To all whom it may concern:*

Be it known that I, JOSEPH H. DICKINSON, of Atlanta, in the county of Fulton and State of Georgia, have invented a new and useful Improvement in Hoisting and Conveying Devices, of which the following is a full, clear, and exact description.

My invention relates to improvements in cableways, ropeways, and similar classes of hoisting and conveying devices in which a carriage is employed traveling upon a trackway and a hoisting-rope extending over a guide on the carriage is used.

My invention comprises the novel features which will be hereinafter described, and particularly pointed out in the claims.

Reference is to be had to the drawings accompanying herewith and forming a part of this specification, in which the same reference characters indicate corresponding parts in the different figures.

Figure 1 is a diagrammatic side elevation of a cableway containing my improvements. Fig. 2 is a side elevation of a carriage, illustrating one form of my invention. Fig. 3 is an edge view of the carriage shown in Fig. 2. Fig. 4 is a side elevation of a carriage, illustrating another form or modification of my invention, and Fig. 5 is an edge view of the carriage shown in Fig. 4.

In the operation of cableway hoisting and conveying devices employing a traveling carriage and a hoisting-rope it is generally necessary to either weight the fall-block to insure its descent or employ fall-rope carriers to support that portion of the hoisting-rope extending from the carriage toward the engine or other means by which the hoisting-rope is operated.

One object of my present invention is to provide means by which the descent of the fall-block may be insured irrespective of its weight or the length of the unsupported portion of the hoisting-rope next to the carriage.

In Fig. 1 I have shown my device as applied to an ordinary cableway. A represents the supporting or trackway cable, which is supported at $a\ a'$, respectively, from the head and tail supports. Upon this trackway-cable A runs the carriage C by means of wheels I. An endless hauling-rope B is attached by its ends to the carriage and extends over guides, as the pulleys 8, 9, 5, and 3, to a drum $G^2$, by which it is actuated and the carriage caused to travel along the trackway.

A hoisting-rope H extends from a drum G over a guide-pulley 1 to the carriage, passing over the pulley P and then down and about the pulley of the fall-block F and up to the carriage, to which its end is secured. The section of the hoisting-rope next to the carriage is replaced by a chain $h$, and the wheel $p$ is made a pocketed or chain wheel, so that the chain has a positive grip thereon.

Mounted in the carriage is a second chain or pocketed wheel T, and connected to turn therewith is a gear-wheel $t$. This gear-wheel meshes with a gear-wheel $p$, which is connected to turn with the chain-wheel P, so that if one of the chain-wheels is turned the other must turn with it.

An endless rope extends from a drum G', as the two runs D and D', over guide-pulleys 2 and 4 on the head-support and guide-pulleys 6 and 7 on the tail-support. The two runs of this rope, which I call a "lowering-rope," are supported, respectively, on pulleys K and T on the carriage. The pulley T, as previously explained, is a chain-wheel and is connected with the chain-wheel P, over which the hoisting-rope passes. That run D' of the lowering-rope which passes over the wheel T has a chain-section $d$ therein adapted when it engages the wheel T to turn said wheel and to thereby turn the wheel P, so that it is possible by manipulating the rope D to assist in lowering the fall-block and the paying out of the hoisting-rope.

I am aware of the Dusedau Patent, No. 566,849, dated September 1, 1896, in which is described a trackway, a hoist mounted on a load-carriage, a run of hoisting-rope extending from the carriage to one end of the trackway, and a run of lowering-rope extending from the carriage to the other end of the trackway, said runs constituting parts of an endless rope operated by a single drum at the engine. In my construction there are two runs of rope extending from the hoist on the carriage to the same end of the trackway— namely, a run of the rope D and the run of the rope H. In my construction also the lowering is effected by hauling in the run of rope (*i. e.*, that run of rope D between the carriage and the head-support) which extends from the carriage to the same end of the trackway with the hoisting-rope. In my construction also these two runs of rope extend to separate drums of the engine, so as to be capable of hauling in in unison as the carriage approaches the head or paying out in unison as the carriage recedes from the head or hauling in and paying out inversely in hoisting or lowering while the carriage is held stationary by the traction-rope B.

A suitable three-rope drum-engine for the three drums G G' G² being known to those skilled in the art, a description or representation of it is unnecessary.

I do not wish to limit myself to the employment of chains or chain-wheels in the hoist as a means of gripping, and in many other respects features may be omitted or changed without departing from the principle of my invention.

Having thus described my invention, what I claim as new, and desire to secure by Letters Patent, is—

1. The combination with a carriage for cableways and similar conveying device having two wheels therein connected to turn together, of a hoisting and a lowering rope adapted each to engage one of said wheels and extending from the carriage to the head-support.

2. In a cableway or similar conveying device the combination with a trackway, a carriage adapted to run thereon, and a hauling-rope connected with said carriage to move it, of a hoisting-rope extending from the carriage to one end of the cableway, a lowering-rope extending past the carriage, two wheels upon the carriage adapted to respectively engage said hoisting-rope and the lowering-rope to turn therewith, said wheels being connected to turn together.

3. In a cableway the combination with a trackway, a carriage thereon, a hauling-rope and a hoisting-rope extending from the carriage to one end of the cableway, of a lowering-rope extending past the carriage, two wheels connected to turn together and adapted respectively to actuate the hoisting-rope and to be actuated by the lowering-rope.

4. In a cableway the combination with a trackway, a carriage thereon, a hauling-rope and a hoisting-rope extending to the head-support, of a lowering-rope, two wheels upon the carriage connected to turn together and provided with means for positively engaging one with the hoisting-rope and the other with the lowering-rope, whereby the hoisting-rope may be positively lowered from the carriage.

5. In a cableway the combination with a trackway, a carriage adapted to run on said trackway and having two wheels connected to turn together and adapted to receive respectively the hoisting and the lowering rope, of a hauling-drum, a hauling-rope connecting the hauling-drum and the carriage to move it, a hoisting-drum, a hoisting-rope extending from the hoisting-drum to the carriage and over one of said connected wheels on the carriage, a lowering-drum, and a lowering-rope extending from said drum to the carriage and engaging the other of said connected wheels on the carriage.

6. The combination with a trackway, and a carriage adapted to travel thereon, of a hoisting-drum, a hoisting-rope extending from said drum to the carriage, a lowering-drum, a lowering-rope extending from its drum to the carriage, and two connected wheels adapted one to receive the hoisting-rope and the other to receive the lowering-rope.

7. A hoisting device comprising two wheels connected to turn together, a hoisting-rope extending from a distance to and about one of said wheels and a lowering-rope extending from a distance to and about the other of said wheels, whereby the outer end of the hoisting-rope may be caused to descend by pulling upon the lowering-rope.

8. In a hoisting and conveying device the combination with a trackway, a carriage adapted to travel on the trackway, a hauling-rope connected with the carriage and a hoisting-rope extending from the carriage to one end of the trackway, of a lowering-rope, and two connected wheels upon the carriage adapted one to receive the hoisting-rope and the other to receive the lowering-rope, said ropes and wheels having driving engagement with each other.

9. In a hoisting device the combination with a hoisting-rope, a hoist lowering-rope, of separate sheaves for said ropes, a driving connection between said sheaves, and means independent thereof for raising the hoisting-rope.

10. In a hoisting apparatus, in combination, a sheave at the top of the fall and a hoisting-rope extending over said sheave and containing two sections of different capacities for engagement; one of said sections forming a clutching engagement with said sheave and the other not.

11. In an apparatus of the class described a trolley and an endless hoist-operating cable therefor in rope-supporting engagement with the said trolley with both its outgoing and return strands.

12. In an apparatus of the class described a trolley and an endless operating-cable therefor in rope-supporting engagement with the trolley at substantially equal distances on either side of the longitudinal center thereof.

In testimony whereof I have hereunto affixed my signature, in the presence of two witnesses, this 18th day of January, 1902.

JOSEPH H. DICKINSON.

Witnesses:
M. S. AMATUTZ,
A. M. DICKINSON.